Jan. 7, 1969 J. S. JOHNSON ETAL 3,420,469
PASSIVE COMMUNICATIONS SATELLITE OR SIMILAR ARTICLE
Filed July 22, 1966

INVENTOR.
JOHN S. JOHNSON
EDWARD E. McCULLOUGH
BY

AGENT

United States Patent Office 3,420,469
Patented Jan. 7, 1969

3,420,469
PASSIVE COMMUNICATIONS SATELLITE OR SIMILAR ARTICLE
John S. Johnson and Edward E. McCullough, Brigham City, Utah, assignors to Thiokol Chemical Corporation, Bristol, Pa., a corporation of Delaware
Filed July 22, 1966, Ser. No. 567,101
U.S. Cl. 244—1      5 Claims
Int. Cl. H01f 10/04; B64g 9/00

ABSTRACT OF THE DISCLOSURE

A hollow body of thin, flexible material having force-field sources therein, so that the surface thereof is maintained smooth by mutual repulsion of adjacent fields of similar polarity.

---

This invention relates to hollow bodies for use outside planetary atmosphere, and more particularly it relates to passive communications satellites or similar articles and to means for maintaining smooth surfaces thereon.

Although passive satellites, in the form of large, inflated balloons, have demonstrated utility for purposes such as communications and possibly navigation, a major difficulty has been that they eventually become battered out of shape by impacts and punctures made by meteoric material. This impairs their usefulness, especially for relaying communications.

The present invention, directed toward overcoming this difficulty, is essentially a hollow body of very thin, flexible material, a smooth surface being maintained thereon by force fields intimately associated with the material.

Objects of the invention are to provide a hollow body for use outside planetary atmosphere that is simply constructed, reliable, reflective to incident electromagnetic radiation, and capable of maintaining a relatively smooth external surface even though punctured by meteoric material.

Other objects and advantages of the invention will become apparent as the following detailed description is read with reference to the accompanying drawings, wherein the same parts are designated by identical characters throughout the views.

Figure 1:
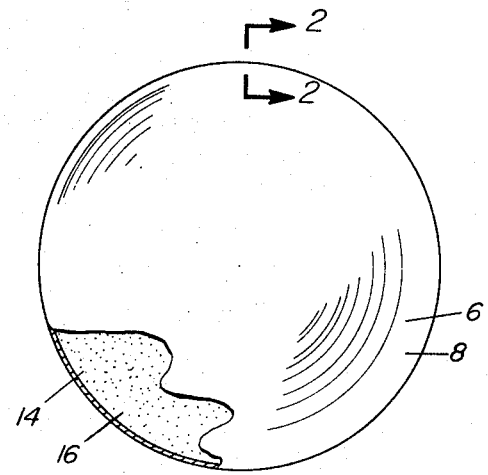
FIGURE 1 is a side view of the invention.
Figure 2:
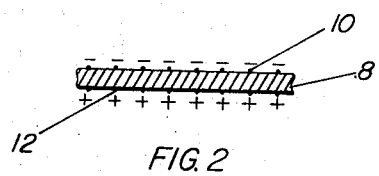
FIGURE 2 is a sectional view of a small portion of the invention taken on the line 2—2 of FIGURE 1.

The preferred form of the invention illustrated in FIGURE 1 is a large, holow body, preferably spherical, of a thin, flexible, electret material 8, such as oriented, polymerized, vinylidene chloride film. It has been found that, when such a material is molecularly oriented by processes well known in the art, a permanent electrostatic field becomes intimately associated with the material, wherein opposite surfaces of the material are of opposite polarity. Hence, negative charges of static electricity on one surface of the material 8, represented by points 10 in FIGURE 2, are mutually repellant, as are the positive charges 12 on the opposite side thereof. Under satellite conditions of vacuum and weightlessness, where virtually no other force except radiation pressure of the solar wind is exerted upon the material 8, these repulsive forces become sufficiently significant to exert tensile stresses on the material 8. Hence, the material 8 tends to maintain a smooth external surface even though punctured by meteoric material. Inclusion of a small amount of gas 14 is desirable for initial inflation of the sphere 6. Opacity to incident electromagentic radiation is achieved by vapor deposit of a metal 16, such as aluminum, on one surface of the material 8. Methods of vapor-depositing metal on surfaces are well known, as are methods of making hollow spheres from flat patterns; and neither is considered to be a part of this invention.

Since it is not necessary that the material 8 have sufficient strength to contain an inflating gas within the body 6, it may be extremely thin and, hence, a very large body having very little mass may be formed therefrom. Such a body could also have utility in devices responsive to the pressure of solar wind.

Figure 3:
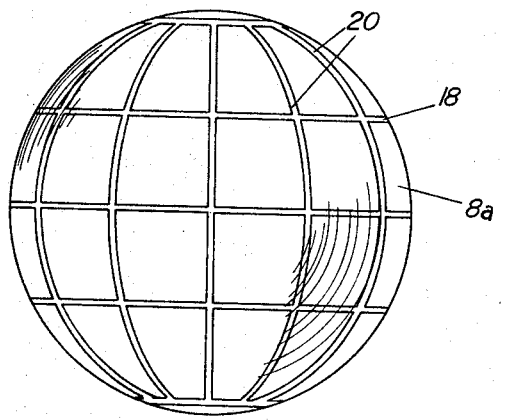
FIGURE 3 is a side view of a second embodiment of invention.

An alternate embodiment of the invention is shown in FIGURE 3 wherein tensile forces are applied to the material 8 by magnetized iron oxide 18 printed preferably on the outside of the material 8a in the form of strips or stiffeners 20 in a manner similar to the manufacture of magnetic recording tape. In this case, the material 8a may be a thin film of polyethylene terephthalate resin, sold under the trade name "Mylar." The strips 20 of iron oxide 18 are magnetized uniformly before the material 8 is made into a sphere so that it has opposite polarities on opposite sides thereof. The force-field sources are small individual magnets therein (not shown) adjacent ones being mutually repellant in a manner similar to that of the static electric charges 10 and 12 shown in FIGURE 2.

What is claimed is:

1. A passive communications satellite or similiar article for use outside planetary atmosphere comprising:
   a hollow body of thin, flexible material; and
   force field sources intimately associated with said material so that at least a portion of a surface thereof is under tension produced by mutually-repulsive fields surrounding said force-field sources, whereby a smooth surface is maintained on said material.

2. The satellite or similar article of claim 1 wherein said thin, flexible material is oriented, polymerized, vinylidene chloride film, and said force-field sources are in the oriented molecules of said film.

3. The satellite or similar article of claim 1 wherein said force-field sources are in magnetized iron oxide on said thin, flexible material.

4. The satellite or similar article of claim 3 wherein said iron oxide is printed on the surface of said material in strips to function as stiffeners.

5. The satellite or similar article of claim 3 wherein said thin, flexible material is polyethylene teraphthalate resin film.

References Cited
UNITED STATES PATENTS

| | | | |
|---|---|---|---|
| 2,996,212 | 8/1961 | O'Sullivan | 244—1 |
| 3,268,184 | 8/1966 | Biggar et al. | 244—1 |
| 3,277,724 | 10/1966 | Lundeberg | 244—1 |

FERGUS S. MIDDLETON, *Primary Examiner.*

U.S. Cl. X.R.
307—88